(12) United States Patent
Zhao

(10) Patent No.: US 11,980,808 B2
(45) Date of Patent: May 14, 2024

(54) GAME CONTROLLER AND FORM TRANSFORMATION METHOD THEREOF, AND GAME OPERATION MODE SWITCHING METHOD

(71) Applicant: Jinlong Zhao, Sichuan (CN)

(72) Inventor: Jinlong Zhao, Sichuan (CN)

( * ) Notice: Subject to any disclaimer, the term of this patent is extended or adjusted under 35 U.S.C. 154(b) by 383 days.

(21) Appl. No.: 17/422,640

(22) PCT Filed: Dec. 19, 2019

(86) PCT No.: PCT/CN2019/126490
§ 371 (c)(1),
(2) Date: Jul. 13, 2021

(87) PCT Pub. No.: WO2020/147503
PCT Pub. Date: Jul. 23, 2020

(65) Prior Publication Data
US 2022/0088473 A1 Mar. 24, 2022

(30) Foreign Application Priority Data

Jan. 14, 2019 (CN) .......................... 201910032960.9

(51) Int. Cl.
*A63F 13/245* (2014.01)
*A63F 13/22* (2014.01)
*A63F 13/219* (2014.01)

(52) U.S. Cl.
CPC ............ *A63F 13/245* (2014.09); *A63F 13/22* (2014.09); *A63F 13/219* (2014.09); *A63F 2300/1018* (2013.01); *A63F 2300/1062* (2013.01)

(58) Field of Classification Search
CPC ...... A63F 13/245; A63F 13/22; A63F 13/219; A63F 2300/1018; A63F 2300/1062
See application file for complete search history.

(56) References Cited

U.S. PATENT DOCUMENTS

| D837,892 S | * | 1/2019 | Armand | ....................... D21/333 |
| 2007/0103443 A1 | * | 5/2007 | Park | .................... H04M 1/0243 |
| | | | | 345/169 |
| 2008/0015017 A1 | * | 1/2008 | Ashida | .................. A63F 13/219 |
| | | | | 463/37 |
| 2010/0149740 A1 | * | 6/2010 | Cheng | .................... A63F 13/42 |
| | | | | 361/679.4 |

(Continued)

FOREIGN PATENT DOCUMENTS

| CN | 2778350 | 5/2006 |
| CN | 10406745 | 4/2009 |

(Continued)

*Primary Examiner* — Steve Rowland
(74) *Attorney, Agent, or Firm* — Thomas H. Stanton; Stanton IP Law Firm P.A.

(57) ABSTRACT

The present disclosure discloses a game controller, including a gun-shaped body, a mode switching mechanism, a gamepad, and a screen positioning device arranged on the gun-shaped body. The mode switching mechanism switches different game operation modes; and the gamepad is rotatably connected to the gun-shaped body. The present disclosure can adapt to most games in the market, which can not only enhance the vicarious feeling of a game, but also provide a more comprehensive operation experience for a user.

8 Claims, 20 Drawing Sheets

(56) References Cited

U.S. PATENT DOCUMENTS

| | | | | |
|---|---|---|---|---|
| 2011/0306424 A1* | 12/2011 | Kazama | ............... | A63F 13/98 |
| | | | | 463/37 |
| 2012/0122576 A1* | 5/2012 | Mao | ............... | A63F 13/219 |
| | | | | 463/32 |
| 2012/0302348 A1* | 11/2012 | Karacal | ............... | A63F 13/837 |
| | | | | 463/38 |
| 2019/0064638 A1* | 2/2019 | O'Neill | ............... | G03B 17/563 |
| 2022/0047940 A1* | 2/2022 | Armand | ............... | A63F 13/837 |

FOREIGN PATENT DOCUMENTS

| | | |
|---|---|---|
| CN | 101698127 | 4/2010 |
| CN | 103949054 | 7/2014 |
| CN | 105413173 | 3/2016 |
| CN | 106039714 | 10/2016 |
| CN | 206762239 | 12/2017 |
| CN | 109758761 | 5/2019 |

\* cited by examiner

GAME CONTROLLER AND FORM TRANSFORMATION METHOD THEREOF, AND GAME OPERATION MODE SWITCHING METHOD

TECHNICAL FIELD

The present disclosure belongs to the technical field of game equipment, and specifically relates to a game controller and a form transformation method thereof, and a game operation mode switching method.

BACKGROUND ART

The China utility model patent (publication No. CN206762239U) disclosed a gun-shaped smart gamepad on Dec. 19, 2017. The gamepad simulates the shape of a gun and changes the layout of game operation buttons to enhance the vicarious feeling of a game. However, this type of gamepad can only be used in several specific shooting games and cannot be adapted to operation modes of other games. At the same time, users need to maintain a gun-holding posture during a game, which can easily lead to anchylosis and muscular soreness.

The China utility model patent (publication No. CN2778350) disclosed a game controller with multiple operation modes on May 10, 2016. The game controller allows a user to select a first operation mode or a second operation mode of a control device through a switching mechanism, thus facilitating the user to select different game operation modes. However, this type of gamepad is inconvenient to operate in shooting games, and difficultly adapts to operation modes of the shooting games, so a user cannot be provided with a more comprehensive operating experience. At the same time, this type of gamepad cannot simulate user's use of a real firearm to play a game, resulting in poor vicarious feeling of the game.

SUMMARY

In order to solve the above-mentioned problems in the existing technology, the present disclosure provides a game controller and a form transformation method thereof, and a game operation mode switching method. The game controller can adapt to most games in the market, which can not only enhance the vicarious feeling of a game, but also provide a more comprehensive operation experience for a user.

The technical solution adopted by the present disclosure is as follows.

A game controller includes a gun-shaped body, a mode switching mechanism, a gamepad, and a screen positioning device arranged on the gun-shaped body. The mode switching mechanism switches different game operation modes (the mode switching mechanism is used to switch different game operation modes); and the gamepad is rotatably connected to the gun-shaped body.

By rotating the gamepad, the game controller can enable a user to conveniently and quickly switch back and forth between a gamepad mode and a gun mode, can simulate use of a real firearm to play a game, and can adapt to most games in the market, which can not only enhance the vicarious feeling of a game, but also provide a more comprehensive operation experience for the user.

As a preference, the game operation modes include a gun operation mode and a gamepad operation mode.

As a preference, the mode switching mechanism is controlled to realize switching by a rotation position of the gamepad. As such, transformation of the form of the game controller is combined with switching of the game operation modes, so that different operation modes can be switched according to user's needs by rotating the gamepad.

As a preference, the gamepad and the gun-shaped body are connected by a rotation part.

As a preference, the rotation part includes a rotating shaft and a sleeve sleeved on the rotating shaft; an outer wall of the rotating shaft is provided with a ring slot in a circumferential direction; an inner wall of the sleeve is snapped to a snap ring in the ring slot; and the rotating shaft and the sleeve are fixedly connected to the gamepad and the gun-shaped body respectively.

As a preference, the rotation part includes a rotating shaft and a sleeve sleeved on the rotating shaft; an inner wall of the sleeve is provided with a ring slot in a circumferential direction; an outer wall of the rotating shaft is snapped to a snap ring in the ring slot; and the rotating shaft and the sleeve are fixedly connected to the gun-shaped body and the handle respectively.

As a preference, two first magnets are embedded into a surface of the snap ring; connecting lines between the two first magnets and the axis of the rotating shaft are perpendicular to each other; and second magnets matching the first magnets are embedded into an inner surface of the ring slot. When the first magnets and the second magnets attract each other, the stability of the gamepad under the gun operation mode or the gamepad mode is guaranteed.

As a preference, the mode switching mechanism is arranged between the snap ring and the ring slot; the mode switching mechanism includes a first arc-shaped contact sheet and a second arc-shaped contact sheet; connecting lines between the first arc-shaped contact sheet as well as the second arc-shaped contact sheet and the axis of the rotating shaft are perpendicular to each other; and the first arc-shaped contact sheet and the second arc-shaped contact sheet are respectively embedded to the surfaces of the snap ring and the ring slot.

As a preference, an end of the gamepad away from the gun-shaped body tilts toward a tail of the gun-shaped body, and an included angle of 50 to 70 degrees is formed between the gamepad and the gun-shaped body. As such, the shape of the game controller matches the shape of a human hand to improve the comfortableness of user's use of the gamepad.

As a preference, the gun-shaped body includes a gun-shaped main body and a clamping body detachably connected to the gun-shaped main body.

A form transformation method for a game controller is provided. The transformation method realizes transformation by rotating a gamepad.

As a preference, according to the above-mentioned form transformation method for the game controller, the transformation method transforms the game controller into a gamepad form or a gun form by rotating the gamepad.

The game controller is switched between the gamepad form and the gun form back and forth by rotating the gamepad. In the gamepad form, a user plays a game in a conventional gamepad operation manner; and in the gun form, the user plays a game in a posture of holding a gun.

A game operation mode switching method is provided. The switching method realizes switching by rotating a gamepad.

As a preference, according to the game operation mode switching method, operation modes include a gun operation mode and a gamepad operation mode.

The present disclosure has the following beneficial effects.

1. After the gamepad in the present disclosure is rotated, the game controller can enable a user to simulate use of a real firearm to play a game, and can adapt to most games in the market, which can not only enhance the vicarious feeling of a game, but also provide a more comprehensive operation experience for the user.
2. The present disclosure combines transformation of the form of the game controller with switching of the game operation modes, so that different operation modes can be switched according to user's needs by rotating the gamepad.
3. The present disclosure makes it possible that the user uses different operation modes to play a game in the same game, and the user can switch the operation mode back and forth between the gun operation mode and the gamepad operation mode in the same game. The present disclosure can adapt to all games played with gamepads in the market, and can also avoid phenomena of anchylosis and muscular soreness and further enhance the operation experience of the user.

REFERENCE SIGNS IN DRAWINGS

1: gun-shaped body; 2: front gamepad; 3: rear gamepad; 4: rocker; 5: function control button; 6: rotating shaft; 7: sleeve; 8: ring slot; 9: snap ring; 10: first magnet; 11: second magnet; 12: first arc-shaped contact sheet; 13: second arc-shaped contact sheet; 14: direction control button; 15: gun-shaped main body; 16: clamping protrusion; 17: clamping slot; 18: clamping groove; 19: clamping block; 20: accommodating hole; 21: clamping ring; 22: spring; 23: function control button A; 24: function control button B; 25: function control button X; 26: function control button Y; 27: independent button; and 28: clamping body.

α: included angle between connection lines of two first magnets and the axis of a rotating shaft; β: an included angle between connecting lines of a first arc-shaped contact sheet as well as a second arc-shaped contact sheet and the axis of the rotating shaft; γ: an included angle between a gamepad and a gun-shaped body.

DETAILED DESCRIPTION OF THE EMBODIMENTS

The embodiments of the present disclosure is described in detail below in combination with the accompanying drawings.

Embodiment 1

Figure 1:
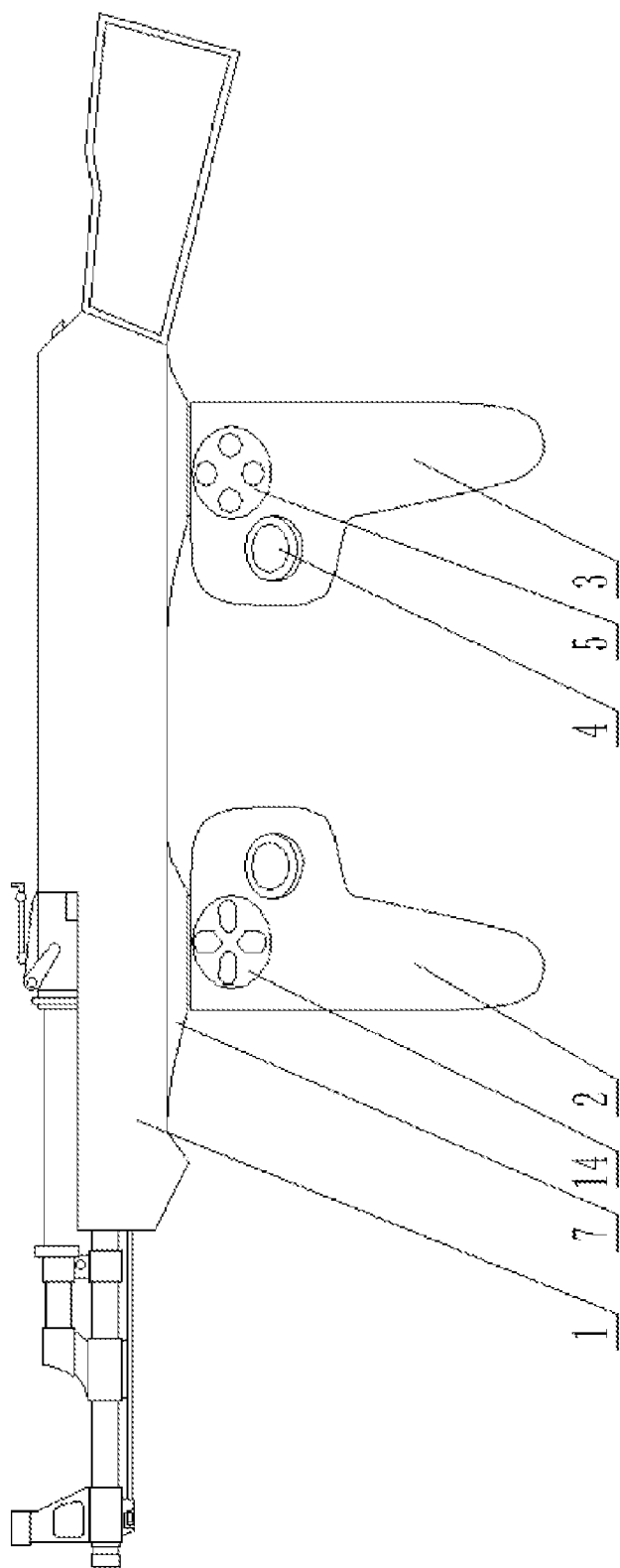
FIG. 1 is a schematic structural diagram when Embodiment 1 is a gamepad operation mode.
Figure 2:
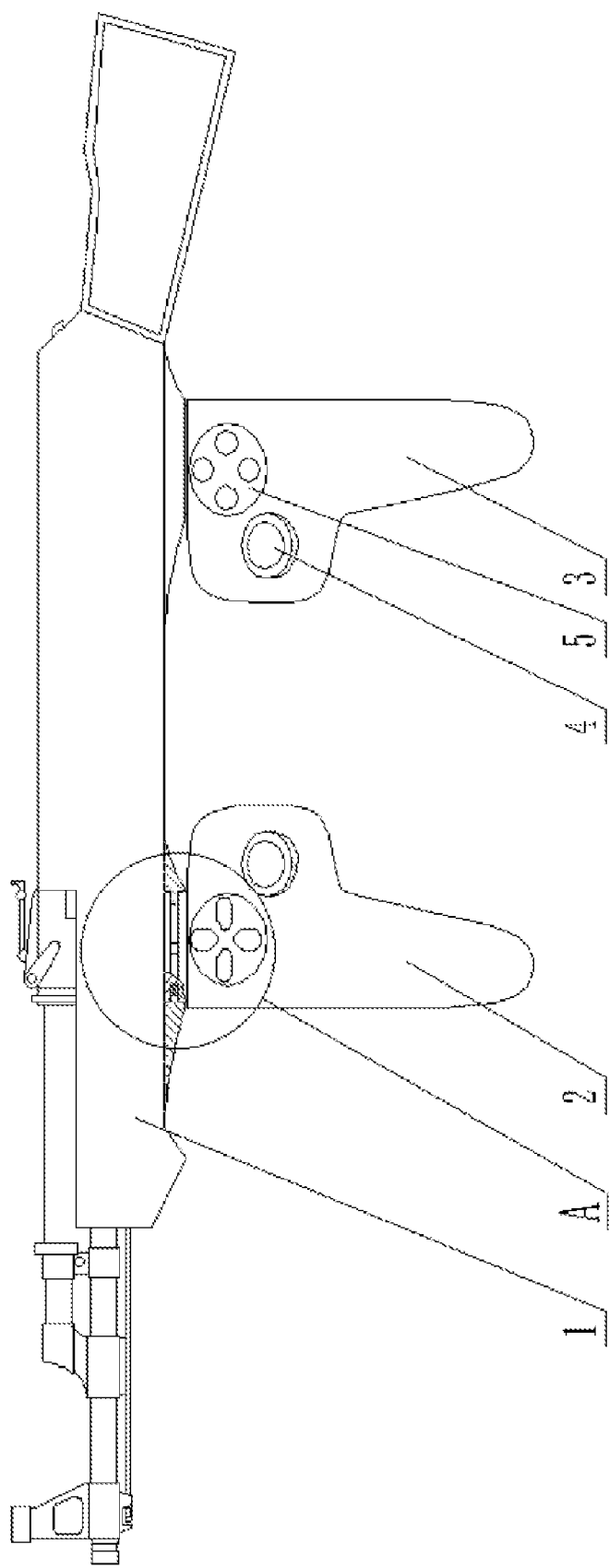
FIG. 2 is a partially enlarged diagram of FIG. 1.
Figure 7:
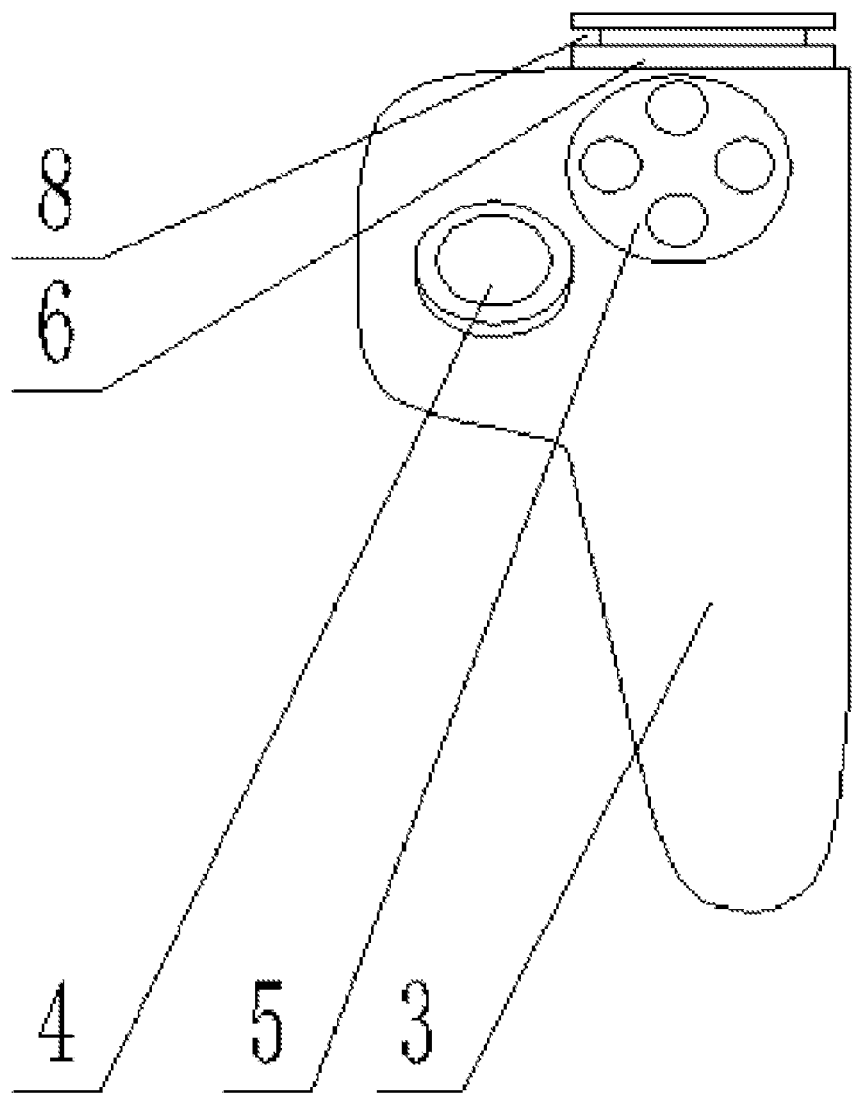
FIG. 7 is a schematic structural diagram of a rear gamepad in Embodiment 1.
Figure 8:
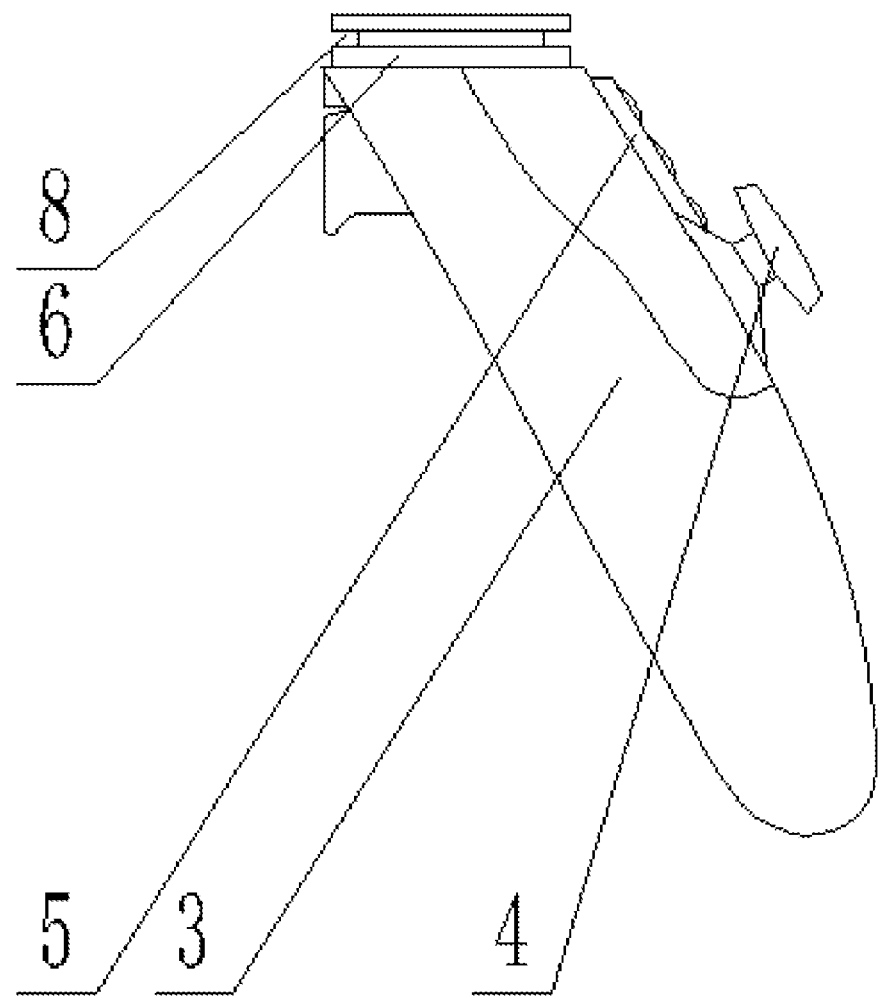
FIG. 8 is a left view of FIG. 7.

A game controller as shown in FIG. 1 to FIG. 2 includes a gun-shaped body 1, a mode switching mechanism, a screen positioning device and two gamepads. The gun-shaped body 1 is of a gun shape; the two gamepads are located at the lower part of the gun-shaped body 1, and include a front gamepad 2 and a rear gamepad 3 (a muzzle of the gun-shaped body 1 in FIG. 1 is leftward, i.e., a left end of the gun-shaped body 1 is a front end, and a right end of the gun-shaped body 1 is a rear end); and the front gamepad 2 is located on the left side of the rear gamepad 3. Game control devices are arranged on both the front gamepad 2 and the rear gamepad 3, and the game control device on the front gamepad 2 includes a direction control button 14 and a rocker 4. As shown in FIG. 7 to FIG. 8, the game control device on the rear gamepad 3 includes a function control button 5 and a rocker 4. The screen positioning device includes a camera and an infrared light-transmittance sheet which are mounted at the front end of the gun-shaped body.

Figure 3:
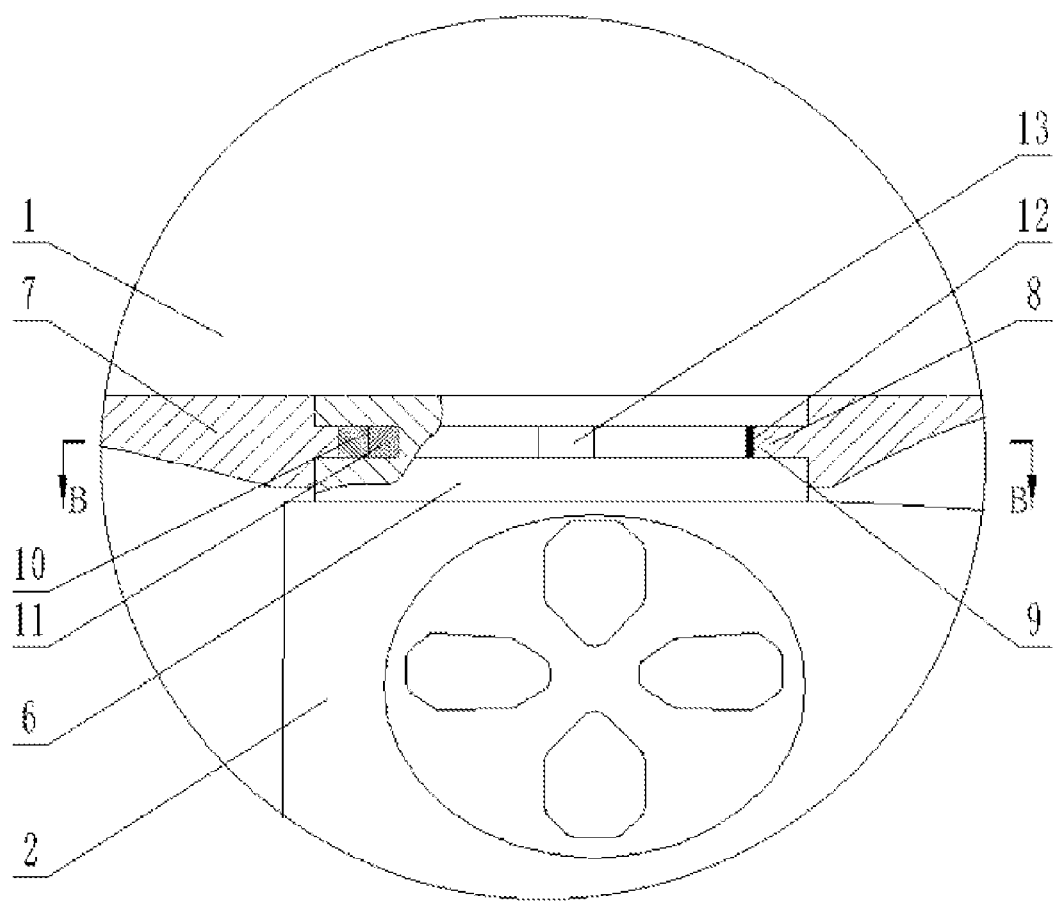
FIG. 3 is a partially enlarged diagram of a portion A in FIG. 2.
Figure 4:
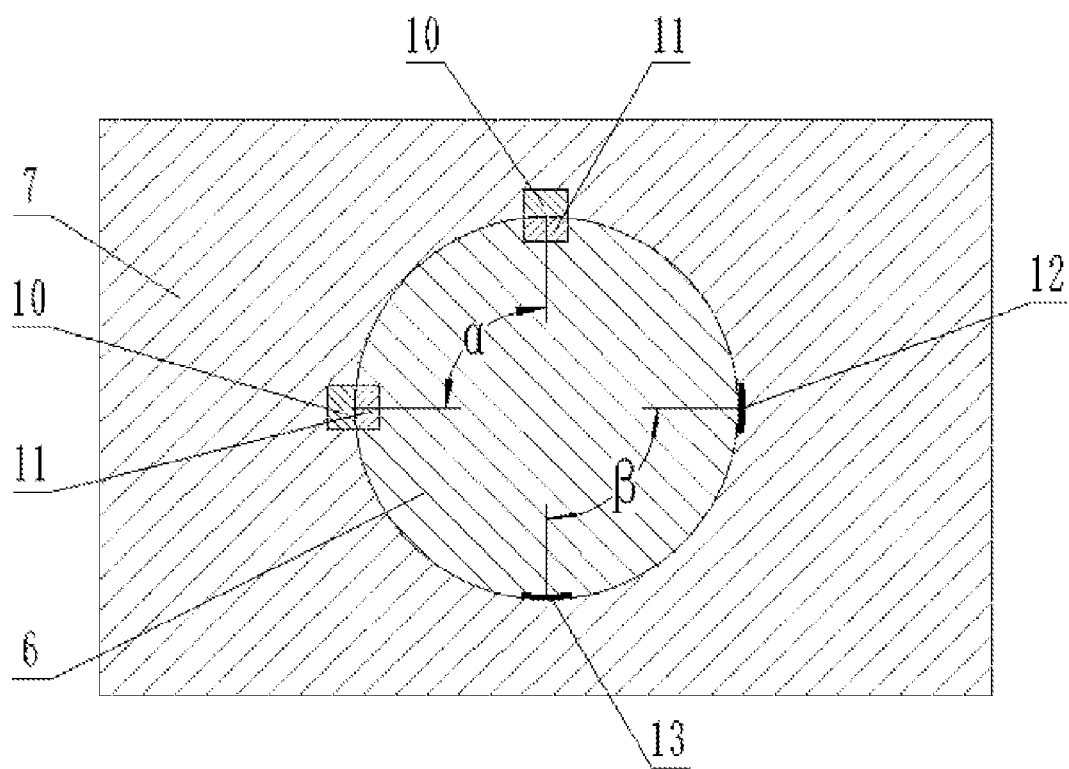
FIG. 4 is a cutaway view of FIG. 3 along B-B.

The upper ends of the two gamepads are connected with the gun-shaped body 1 through a rotation part. As shown in FIG. 3, the rotation part includes a rotating shaft 6 and a sleeve 7 sleeved on the rotating shaft 6. An outer wall of the rotating shaft 6 is provided with a ring slot 8 in a circumferential direction; an inner wall of the sleeve 7 is snapped to a snap ring 9 in the ring slot 8; and the rotating shaft 6 and the sleeve 7 are fixedly connected to the gamepad and the gun-shaped body 1 respectively. Two first magnets 10 are embedded into a surface of the snap ring 9; as shown in FIG. 4, connecting lines between the two first magnets 10 and the axis of the rotating shaft 6 are perpendicular to each other (i.e., α in FIG. 4 is 90 degrees); and two second magnets 11 matching the first magnets 10 are embedded into an inner surface of the ring slot 8. Different magnetic poles of the first magnets 10 and the second magnets 11 are opposite.

As shown in FIG. 3 to FIG. 4, the mode switching mechanism is arranged between the snap ring 9 and the ring slot 8 in the front gamepad 2. The mode switching mechanism is a mechanical switch, which can switch two different game operation modes, i.e., a gamepad operation mode and a gun operation mode. The mode switching mechanism is in communication connection with a processor arranged inside the gun-shaped body 1 (the processor and a connection manner for the processor and the mode switching mechanism are both existing, such as a processor disclosed in the Chinese utility model patent No. CN2778350). The processor communicates with game software. The processor may execute an operation to determine whether a user selects the gamepad operation mode or the gun operation mode, and use the gamepad operation mode or the gun operation mode of the game control device according to the selection of the user.

As shown in FIG. 3 to FIG. 4, the mode switching mechanism specifically includes a first arc-shaped contact sheet 12 and a second arc-shaped contact sheet 13. The first arc-shaped contact sheet 12 and the second arc-shaped contact sheet 13 are located on the same horizontal plane; and connecting lines between the first arc-shaped contact sheet 12 as well as the second arc-shaped contact sheet 13 and the axis of the rotating shaft 6 are perpendicular to each other (i.e., β in FIG. 4 is 90 degrees). The first arc-shaped contact sheet 12 and the second arc-shaped contact sheet 13 are respectively embedded into the surfaces of the snap ring 9 and the ring slot 8.

A working principle of the above-mentioned game controller is as follows.

In the gamepad operation mode, a user operates the front gamepad 2 and the rear gamepad 3 respectively with a left hand and a right hand. The gamepad operation mode is the existing operation mode, such as a gamepad operation mode in xbox and PlayStation. At this time, the two corresponding pairs of first magnets 10 and second magnets 11 attract each other to ensure the stability of the two gamepads in the gamepad operation mode. At the same time, the first arc-shaped contact sheet 12 and the second arc-shaped contact sheet 13 are in no contact, and the mechanical switch is not closed. At this time, the processor determines that the user selects the gamepad operation mode and transmits information to the game software. The game software uses the gamepad operation mode for the user to operate.

Figure 5:
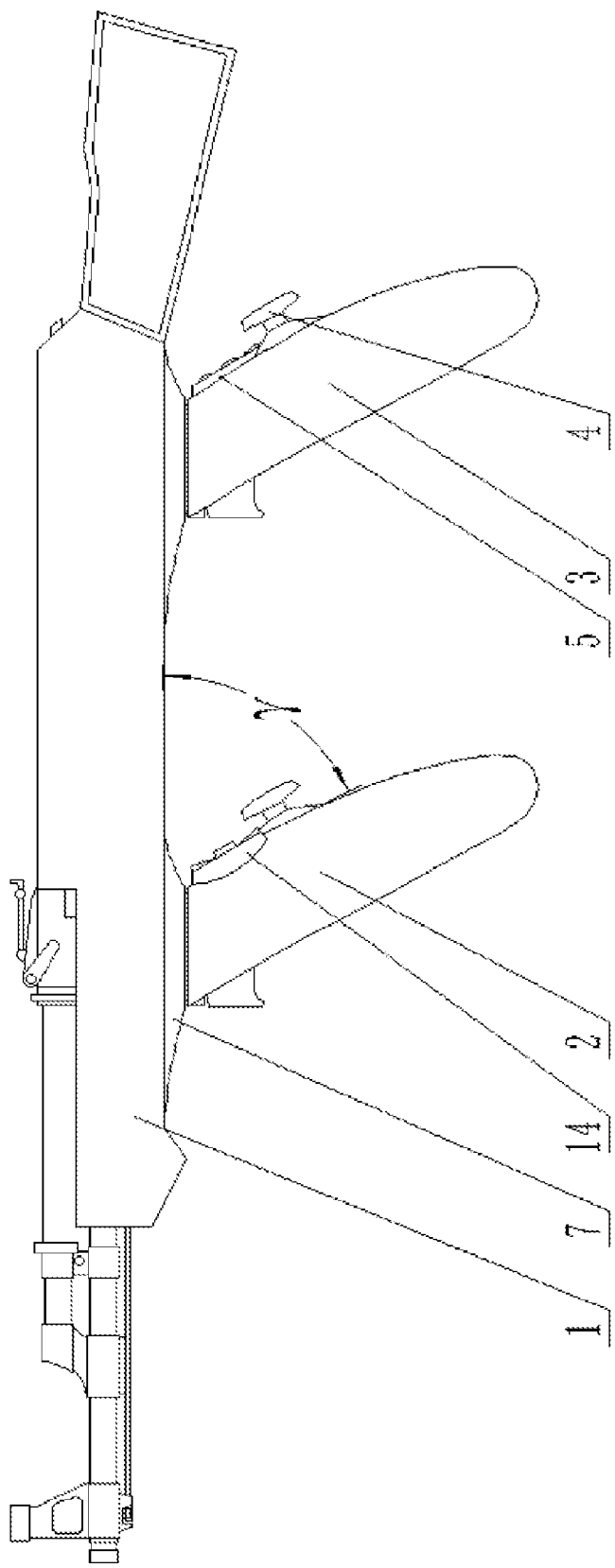
FIG. 5 is a schematic structural diagram when the embodiment is a gun operation mode.
Figure 6:
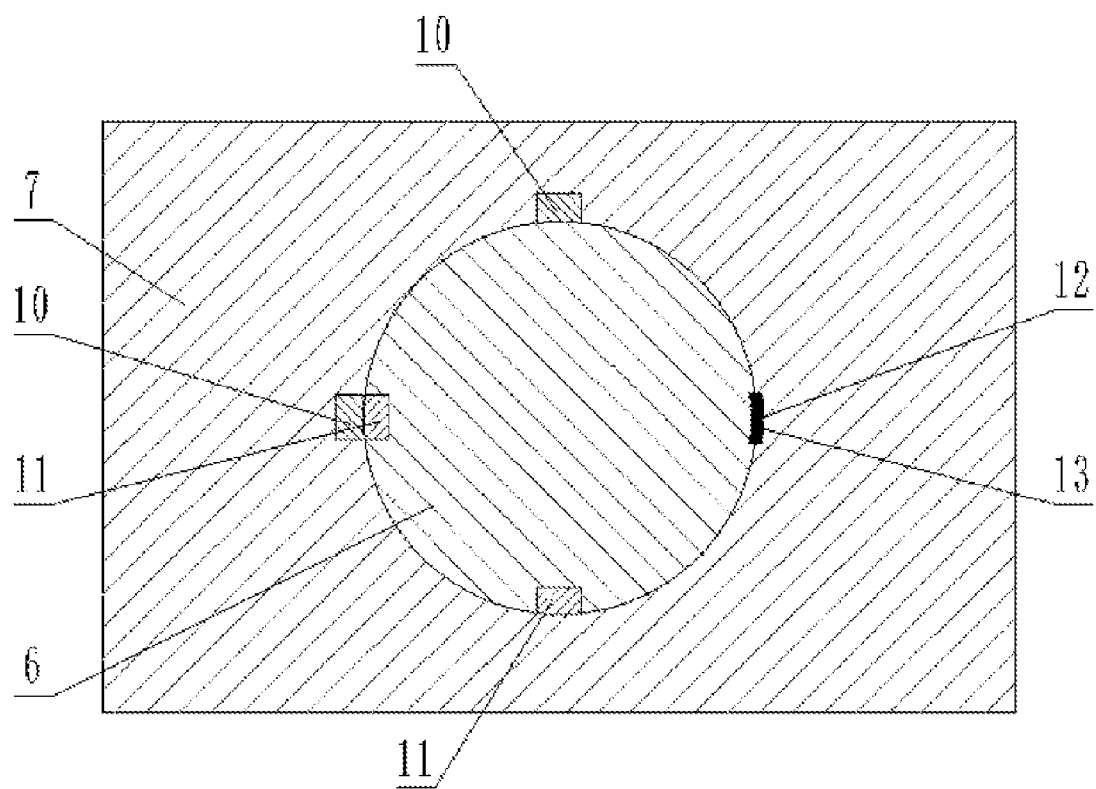
FIG. 6 is a schematic diagram of a gun mode of FIG. 4.

In the gun operation mode, after the front gamepad 2 and the rear gamepad 3 are anticlockwise rotated 90 degrees, the shape of the game controller is as shown in FIG. 5. At this time, only one pair of first magnet 10 and second magnet 11 attract each other to ensure the stability of the two gamepads in the gun operation mode. At the same time, the first arc-shaped contact sheet 12 and the second arc-shaped contact sheet 13 are in contact, as shown in FIG. 6, and the mechanical switch is closed. At this time, the processor determines that the user selects the gun operation mode and transmits information to the game software. The game software uses the gun operation mode for the user to operate. The gun operation mode is an existing operation mode, such as a gun operation mode in xbox and PlayStation, and screen aiming positioning equipment is added. For example, according to an infrared light gun positioning method and system disclosed in China invention patent (publication No. CN103949054A), an operation mode is specifically as follows. Four infrared light emitting points are mounted at four corners of a screen; and the front end of the gun-shaped body is provided with a camera and an infrared light-transmittance sheet. The user plays a game in a posture of holding a gun. The user presses the function control button to control the camera to collect images of the infrared light emitting points, and an aiming position of the gun body is calculated by means of image identification and an algorithm.

Meanwhile, in order to improve the comfortableness of user's use of the gamepad, an included angle of 60 degrees (i.e., γ in FIG. 5 is 60 degrees) is reserved between the gamepad and the gun-shaped body 1.

The above-mentioned game controller has the advantages that transformation of the form of the game controller is combined with switching of the game operation modes, so that different operation modes can be switched according to user's needs by rotating the gamepad. Meanwhile, after the gamepad is rotated, the game controller can simulate user's use of a real firearm to play a game, which enhances the vicarious feeling of a game and provides a more comprehensive operation experience for the user.

Embodiment 2

Figure 9:
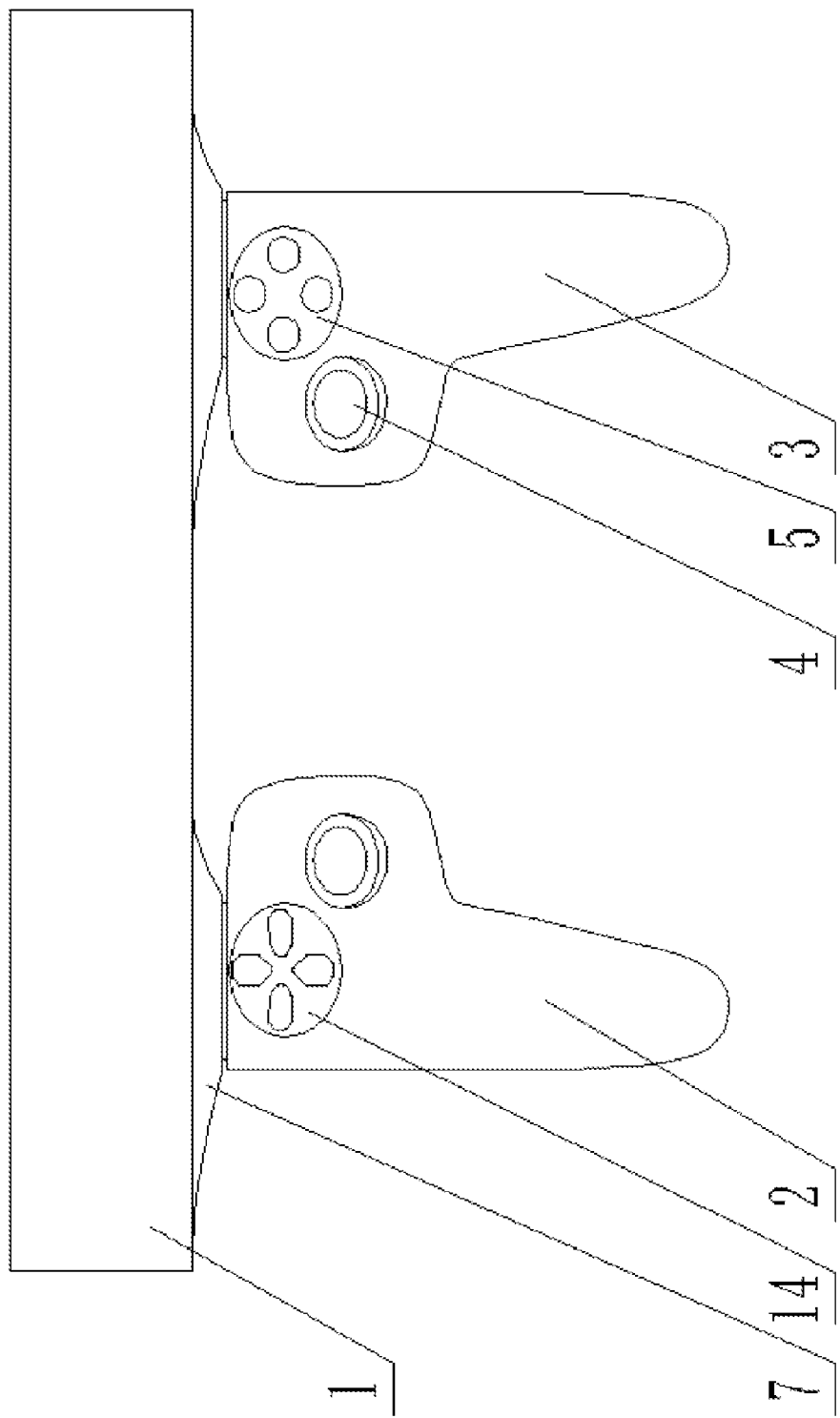
FIG. 9 is a schematic structural diagram of Embodiment 2.

As shown in FIG. 9, Embodiment 2 is improved on the basis of Embodiment 1. The gun-shaped body 1 in Embodiment 2 is cuboid. As such, the game operation mode is still the gun operation mode, but the gun-shaped body 1 does not simulate the appearance of a firearm, which is easy to manufacture and low in cost.

Other structures and the working principle of Embodiment 2 are the same as Embodiment 1.

Embodiment 3

Embodiment 3 is improved on the basis of Embodiment 1. Specifically, in Embodiment 3, an inner wall of the sleeve 7 is provided with a ring slot 8 in a circumferential direction, and an outer wall of the rotating shaft 6 is provided with a snap ring 9 snapped to the ring slot 8. As such, reliable rotatable connection between the sleeve 7 and the rotating shaft 6 can still be ensured.

Other structures and the working principle of Embodiment 3 are the same as Embodiment 1.

Embodiment 4

Figure 10:
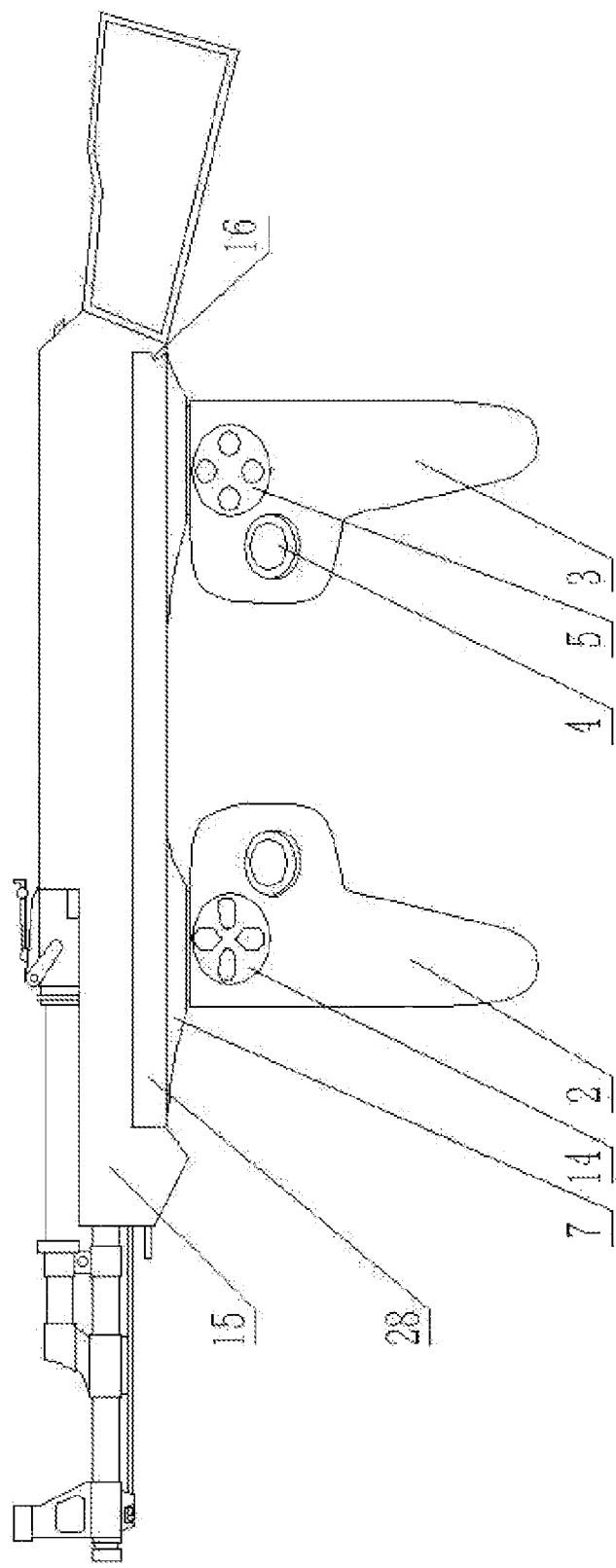
FIG. 10 is a schematic structural diagram of Embodiment 4.
Figure 11:
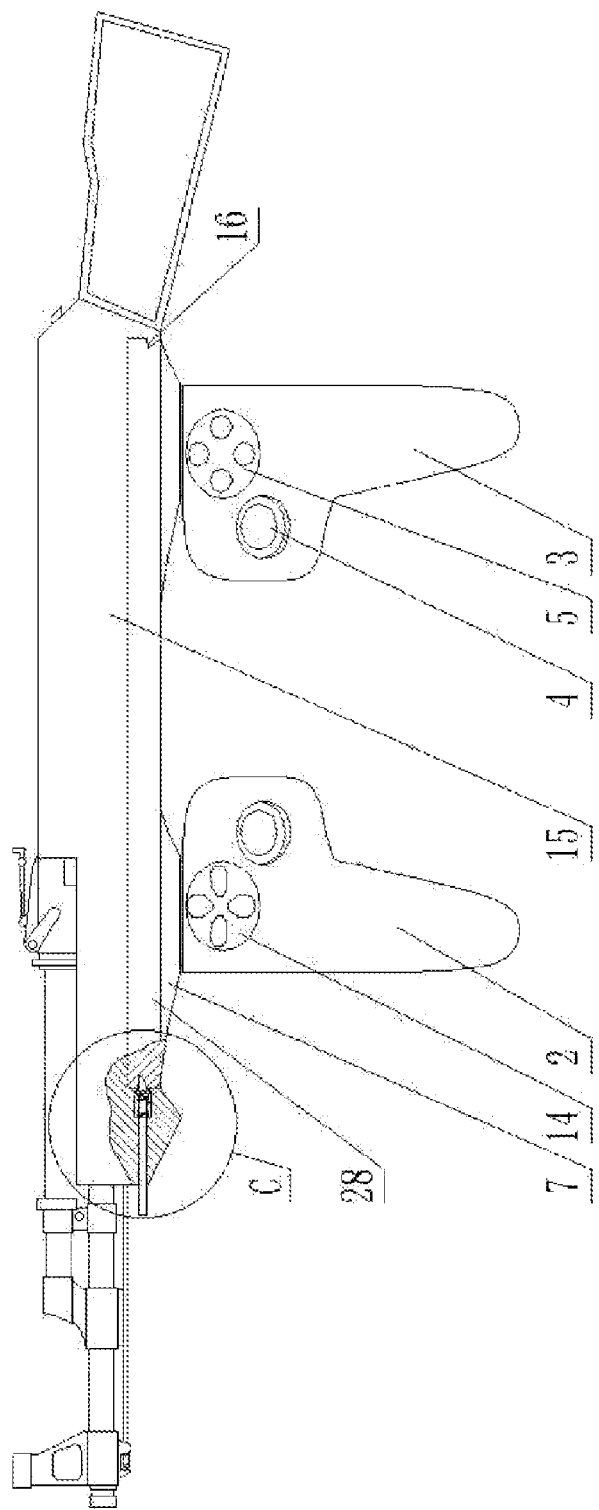
FIG. 11 is a partially enlarged diagram of FIG. 10.
Figure 12:
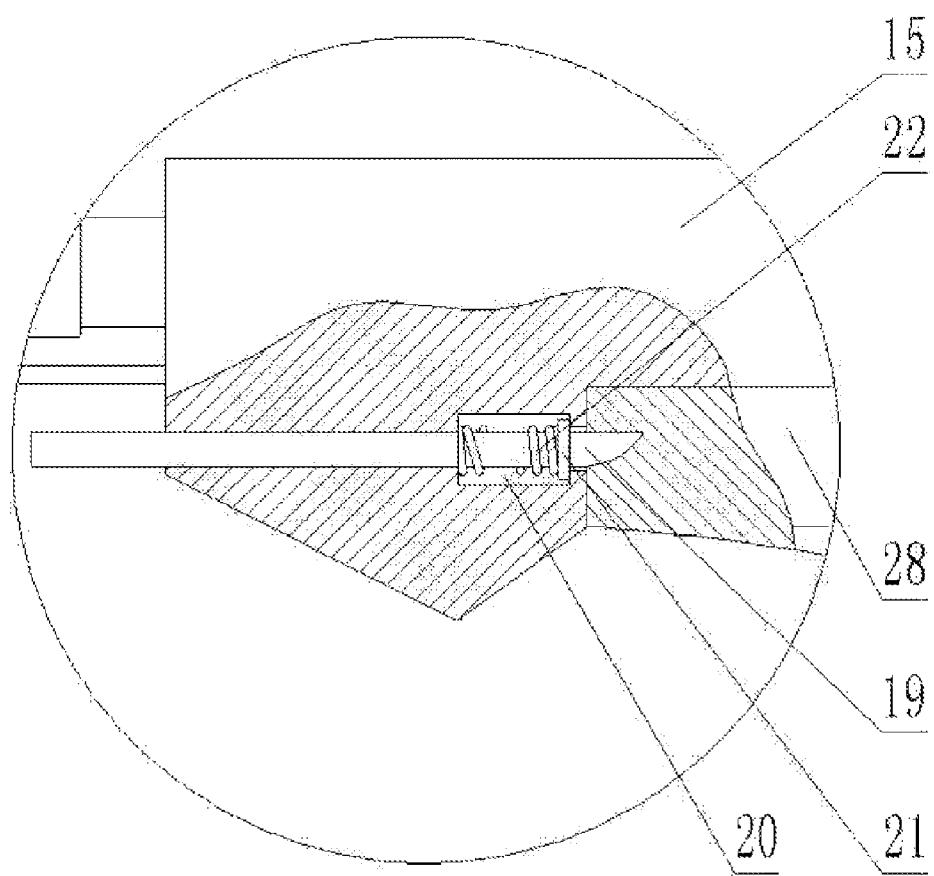
FIG. 12 is a partially enlarged diagram of a portion C in FIG. 11.
Figure 13:
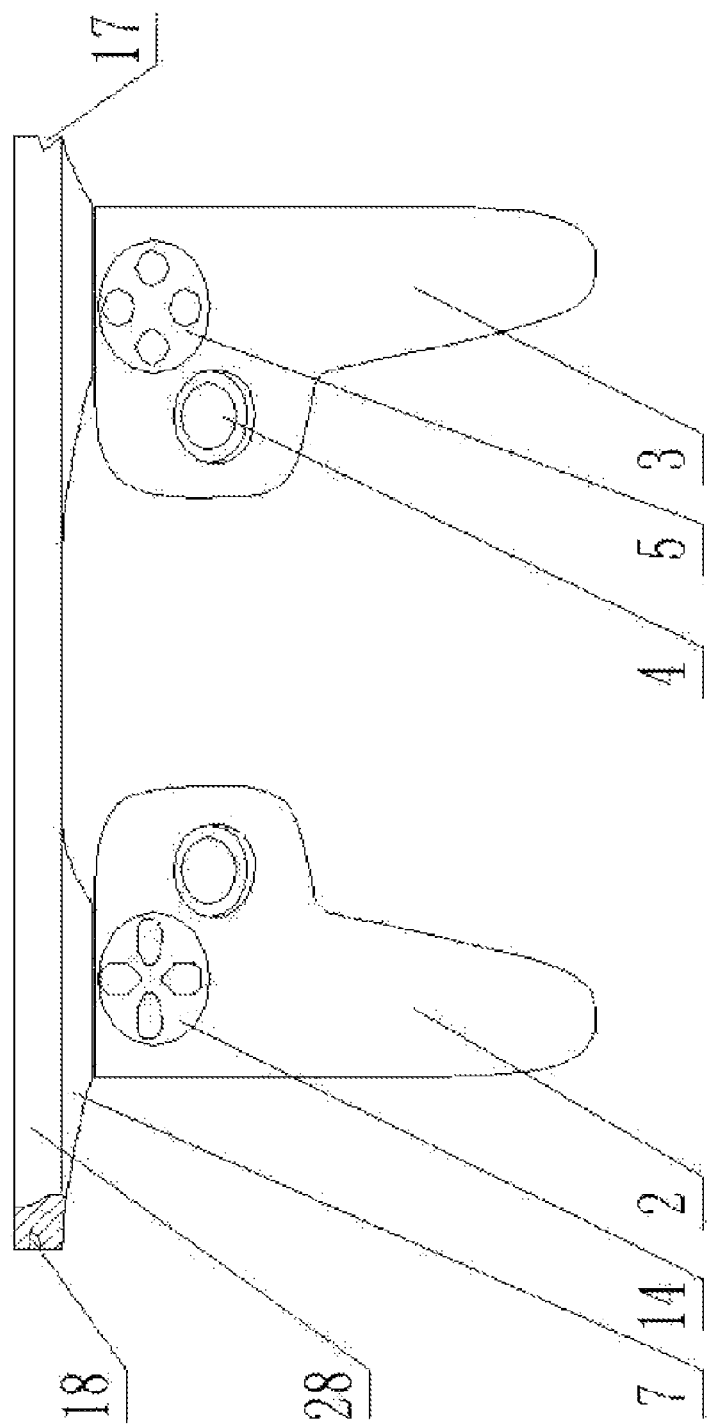
FIG. 13 is a schematic structural diagram when a gun-shaped main body is removed in Embodiment 4.

As shown in FIG. 10 to FIG. 12, Embodiment 4 is improved on the basis of Embodiment 1. The gun-shaped body 1 in Embodiment 4 includes a gun-shaped main body 15 and a clamping body 28 detachably connected to the gun-shaped main body 15. A screen positioning device is arranged on the gun-shaped main body 15, and the lower part of the gun-shaped body 1 is provided with a snap slot matching the shape of the clamping body 28. As shown in FIG. 13, the upper ends of the two gamepads are rotatably connected to the clamping body 28 respectively; the right end of the clamping body 28 is provided with a clamping slot 17; and a position of the gun-shaped body 1 facing the clamping slot 17 is provided with a clamping protrusion 16. A clamping groove 18 is formed in a left end surface of the clamping body 28; a position of the gun-shaped body 1 facing the clamping groove 18 is provided with an accommodating hole 20; the accommodating hole 20 is a stepped hole, and a clamping block 19 is arranged in the accommodating hole 20; the right end of the clamping block 19 extends rightward out of the accommodating hole 20 and is clamped into the clamping groove 18; and the left end of the clamping block 19 runs through the accommodating hole 20 and extends out of the gun-shaped body 1. The clamping block 19 is fixedly connected with a clamping ring 21; the clamping ring 21 is restrained in the accommodating hole 20; a spring 22 is arranged between the clamping ring 21 and the accommodating hole 20; and the spring 22 is sleeved on the clamping block 19.

A user shifts the right end of the clamping block 19 to the right to separate the clamping block 19 from the clamping groove 18, that is, the clamping body 28 may be removed from a side surface of the gun-shaped main body 15 (that is, the clamping body 28 is removed from a direction perpendicular to the drawing in FIG. 10). After the clamping body 28 is removed, the user can play a game in a gamepad form conveniently. When the user intends to play a game in a gun form, the user only needs to clamp the clamping body 28 to the gun-shaped main body 15, which is extremely convenient.

Other structures and the working principle of Embodiment 4 are the same as Embodiment 1.

Embodiment 5

Figure 14:
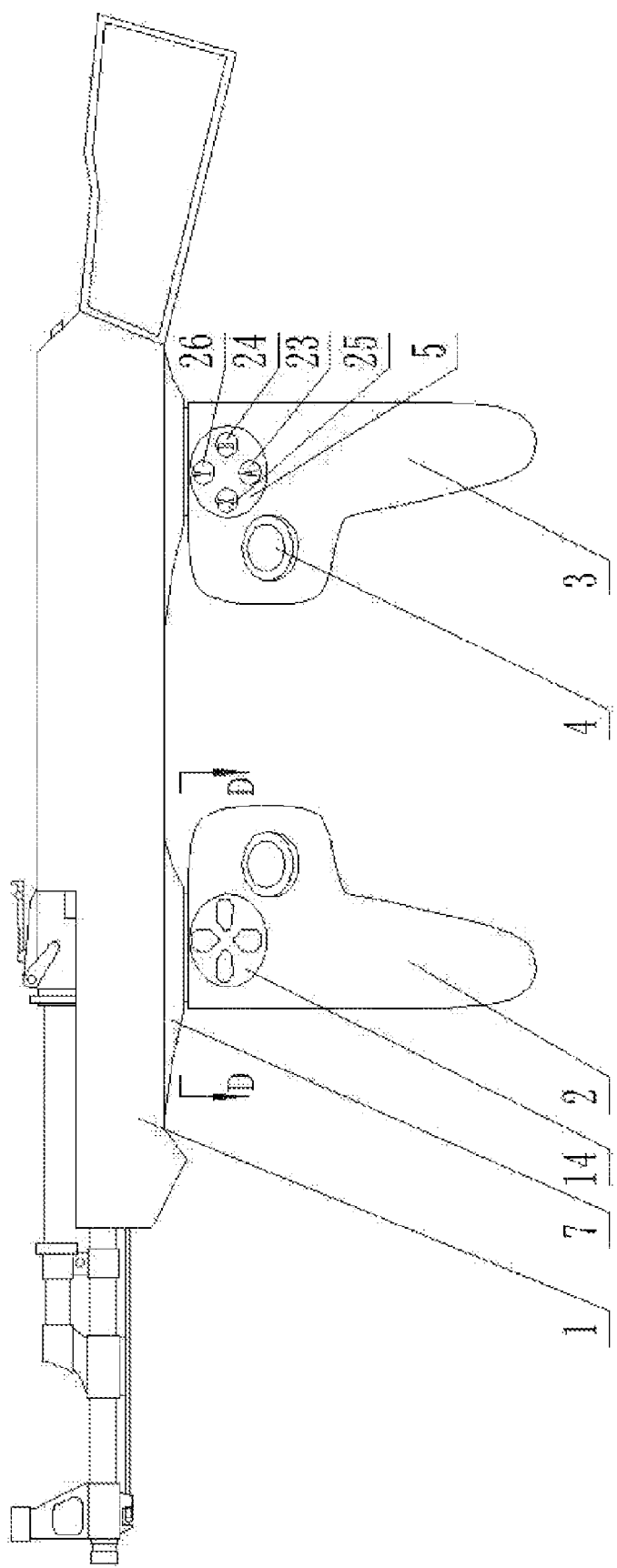
FIG. 14 is a schematic structural diagram of Embodiment 5.
Figure 15:
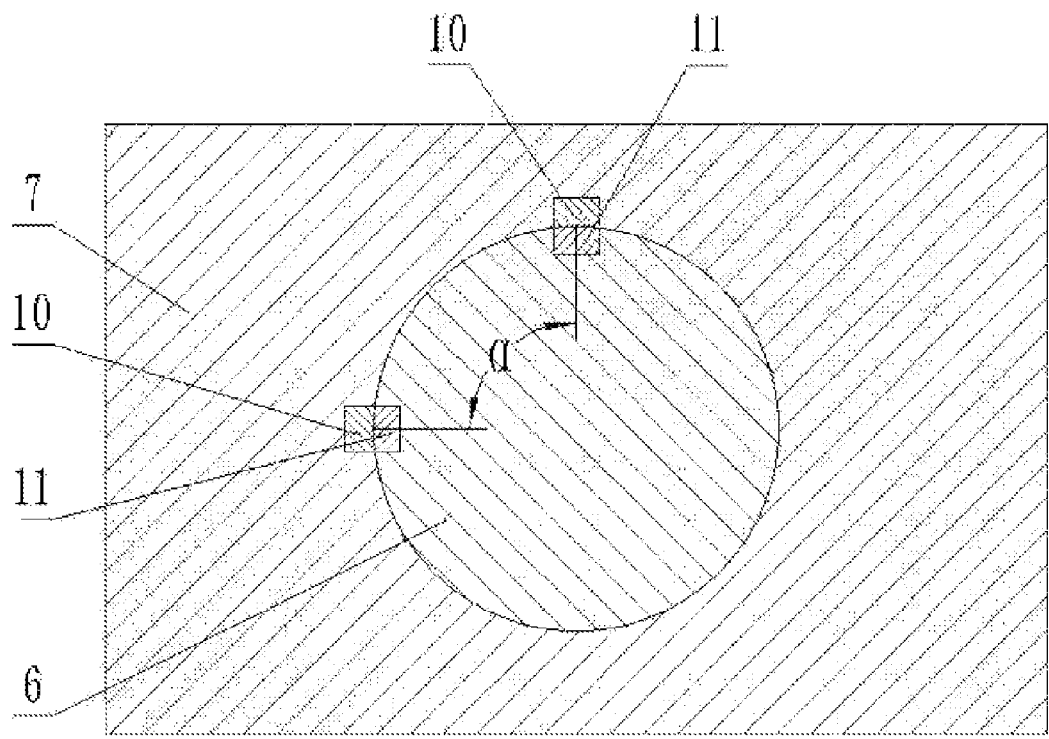
FIG. 15 is a cutaway view of FIG. 14 along D-D.

As shown in FIG. 14 to FIG. 15, Embodiment 5 is improved on the basis of Embodiment 1. A difference between Embodiment 5 and Embodiment 1 is that the mode switching mechanism is changed. Specifically, the mechanical switch arranged between the snap ring 9 and the ring slot 8 in the front gamepad 2 is canceled, and a function control button B24 on the rear gamepad 3 is used as a mode switching mechanism. As such, transformation of the form of the game controller and switching of the game operation modes are separated. After the user rotates the gamepad to transform the form of the gamepad, the game operation mode may not be automatically switched (that is, after the user rotates the gamepad, the game operation mode cannot be switched until the function control button B24 is pressed).

The game controller in Embodiment 5 has the advantages that the user presses the function control button B24 and rotates the gamepad to simulate user's use of a real firearm to play a game, which enhances the vicarious feeling of the game and provides a more comprehensive operation experience for the user.

Other structures and the working principle of Embodiment 5 are the same as Embodiment 1.

Embodiment 6

Figure 16:
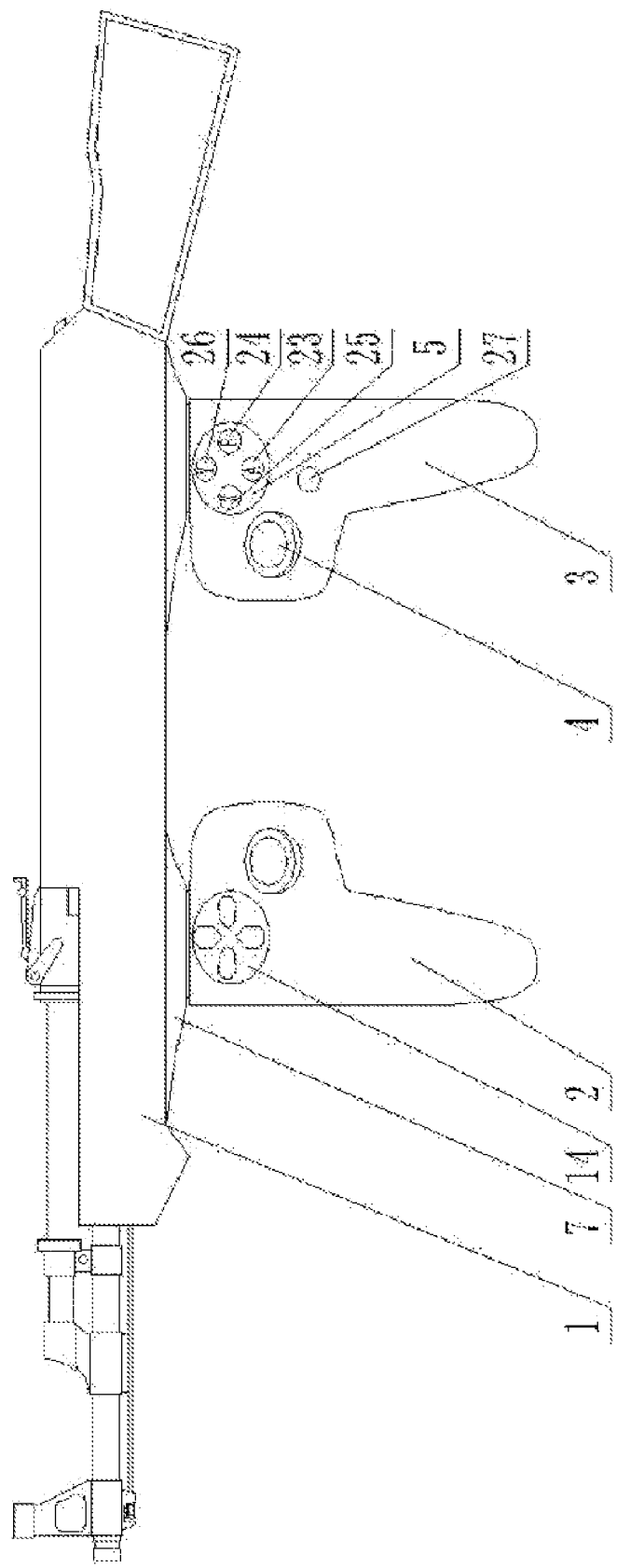
FIG. 16 is a schematic structural diagram of Embodiment 6.

As shown in FIG. 16, Embodiment 6 is improved on the basis of Embodiment 1. A difference between Embodiment 6 and Embodiment 1 is that the mode switching mechanism is changed. Specifically, the mechanical switch arranged between the snap ring 9 and the ring slot 8 in the front gamepad 2 is canceled, and an independent button 27 on the rear gamepad 3 is used as a mode switching mechanism. As such, transformation of the form of the game controller and switching of the game operation modes are separated. After the user rotates the gamepad to transform the form of the gamepad, the game operation mode may not be automatically switched (that is, after the user rotates the gamepad, the game operation mode cannot be switched until the independent button 27 is pressed). In this way, compared with Embodiment 5, the present embodiment takes the independent button 27 as an independent mode switching mechanism, so that an original game function of the function control button B24 cannot be occupied.

Other structures and the working principle of Embodiment 6 are the same as Embodiment 1.

Embodiment 7

Figure 17:
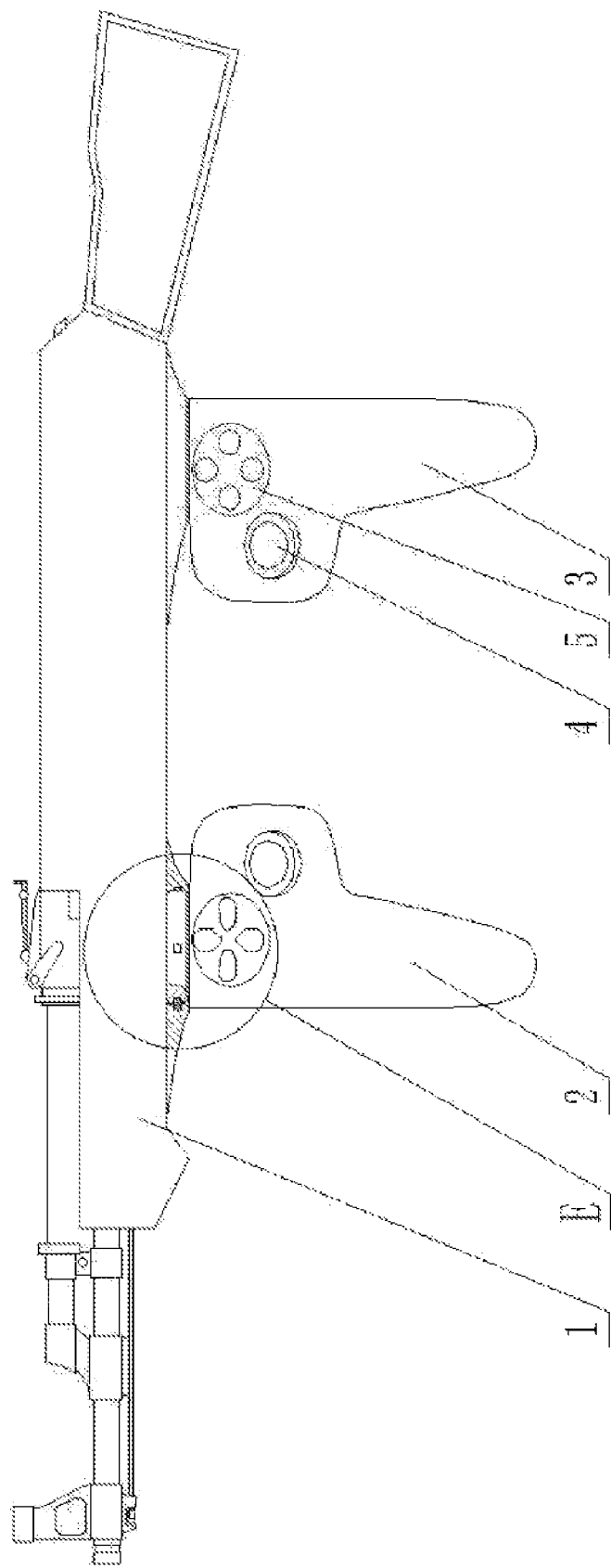
FIG. 17 is a schematic structural diagram of Embodiment 7.
Figure 18:
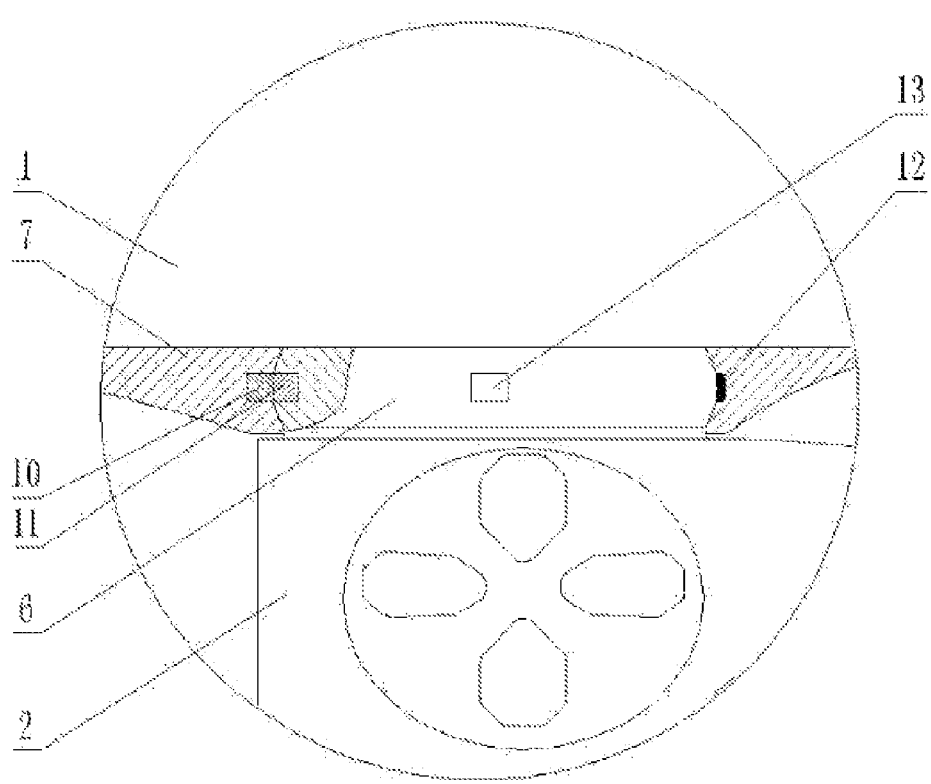
FIG. 18 is a partially enlarged diagram of a portion E in FIG. 17.

As shown in FIG. 17 to FIG. 18, Embodiment 7 is improved on the basis of Embodiment 1. A difference between Embodiment 7 and Embodiment 1 is that the structure of the rotation part is changed. Specifically, the rotating shaft 6 is changed into a drum shape, and the inner wall of the sleeve 7 is changed into a drum shape matching the rotating shaft 6.

Other structures and the working principle of Embodiment 7 are the same as Embodiment 1.

Embodiment 8

Figure 19:
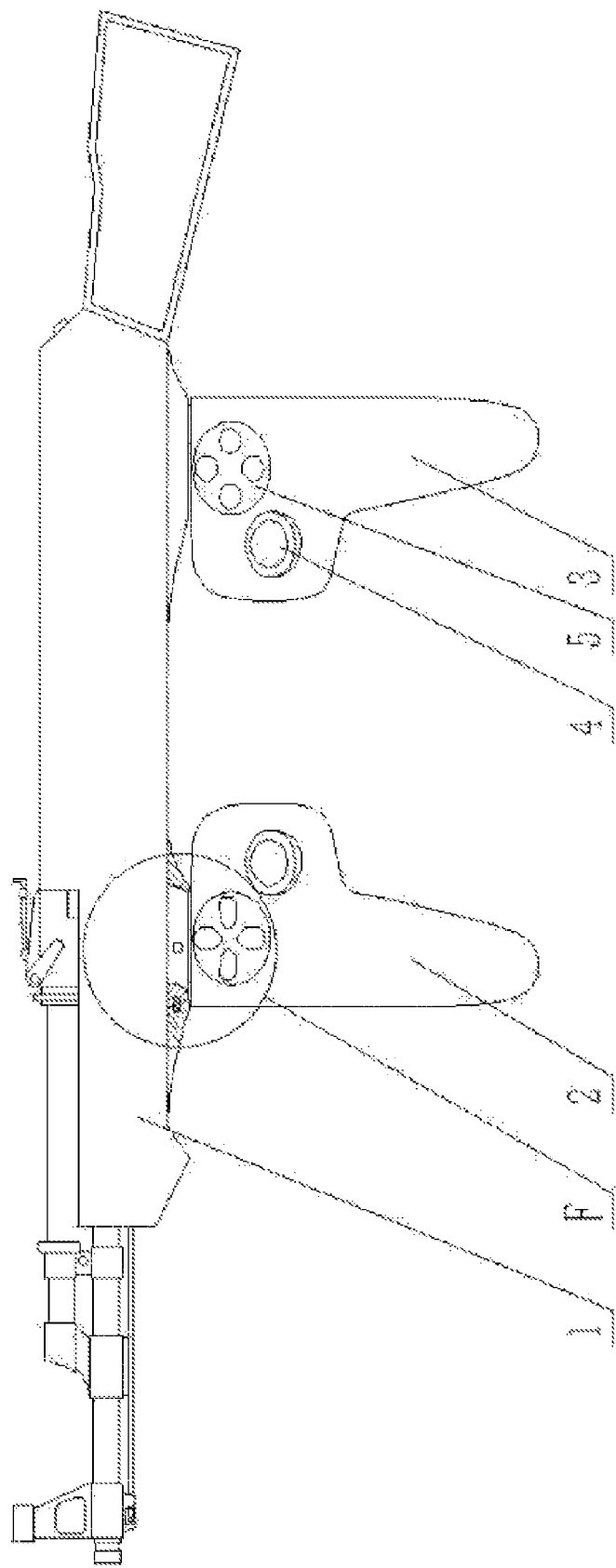
FIG. 19 is a schematic structural diagram of Embodiment 7.
Figure 20:
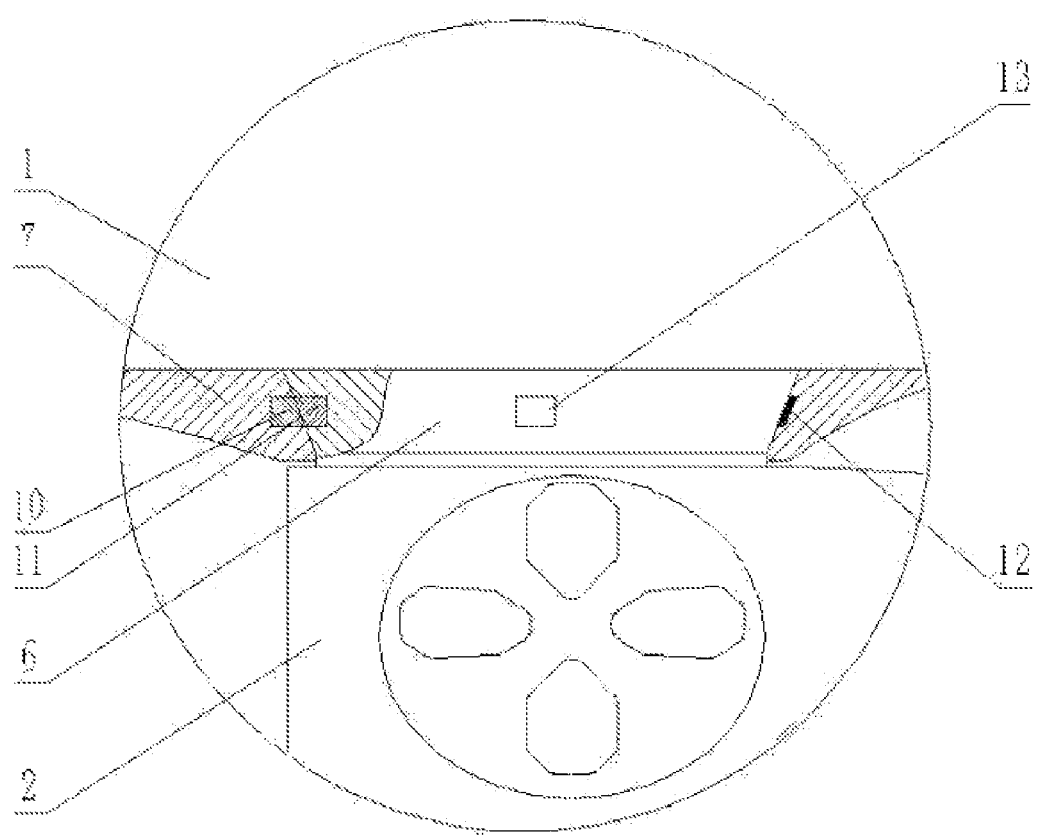
FIG. 20 is a partially enlarged diagram of a portion F in FIG. 19.

As shown in FIG. 19 to FIG. 20, Embodiment 8 is improved on the basis of Embodiment 1. A difference between Embodiment 8 and Embodiment 1 is that the structure of the rotation part is changed. Specifically, the rotating shaft 6 is changed into an inverted cone shape, and the inner wall of the sleeve 7 is changed into an inverted cone shape matching the rotating shaft 6.

Other structures and the working principle of Embodiment 8 are the same as Embodiment 1.

Embodiment 9

Embodiment 9 uses the equipment structure in Embodiment 1 to play a game. A specific game is PLAYERUNKNOWN'S BATTLEGROUNDS. When a user manipulates a virtual character to explore a game map and pick up equipment, a gamepad operation mode is used to play the game. When the user manipulates the virtual character to raise the gun to aim and shoot, a gun operation mode is used to play the game. In the gun operation mode, what is different from a traditional moving screen image is that a center point of the screen image is taken as a shooting point. Gamepad function buttons are used to move and rotate a game image, and a screen positioning point captured by a positioning system is a game shooting point to simulate a real shooting feeling. Images during shooting are similar to Virtua Cop.

As such, the user can use different operation modes to play a game in the same game, and the user can switch the operation mode back and forth between the gun operation mode and the gamepad operation mode, so as to avoid phenomena of anchylosis and muscular soreness and further enhance the operation experience of the user.

The above-mentioned embodiments only express several implementation modes of the present disclosure, and their descriptions are more specific and detailed, but they cannot be understood as limiting the patent scope of the present disclosure. It should be noted that those of ordinary skill in the art can further make various transformations and improvements without departing from the concept of the disclosure, and these transformations and improvements all fall within the protection scope of the present disclosure.

What is claimed is:

1. A game controller, comprising a gun-shaped body, a mode switching mechanism, a gamepad, and a screen positioning device arranged on the gun-shaped body, wherein the mode switching mechanism switches different game operation modes, and the gamepad is rotatably connected to the gun-shaped body,
   wherein the gamepad is connected with the gun-shaped body through a rotation part; and
   wherein the rotation part comprises a rotating shaft and a sleeve sleeved on the rotating shaft; an outer wall of the rotating shaft is provided with a ring slot in a circumferential direction; an inner wall of the sleeve is snapped to a snap ring in the ring slot; and the rotating shaft and the sleeve are fixedly connected to the gamepad and the gun-shaped body respectively.

2. The game controller according to claim 1, wherein the mode switching mechanism is controlled to realize switching by a rotation position of the gamepad.

3. The game controller according to claim 1, wherein two first magnets are embedded into a surface of the snap ring;

connecting lines between the two first magnets and the axis of the rotating shaft are perpendicular to each other; and second magnets matching the first magnets are embedded into an inner surface of the ring slot.

4. The game controller according to claim 3, wherein the mode switching mechanism is arranged between the snap ring and the ring slot; the mode switching mechanism comprises a first arc-shaped contact sheet and a second arc-shaped contact sheet; connecting lines between the first arc-shaped contact sheet as well as the second arc-shaped contact sheet and the axis of the rotating shaft are perpendicular to each other; and the first arc-shaped contact sheet and the second arc-shaped contact sheet are respectively embedded to the surfaces of the snap ring and the ring slot.

5. A form transformation method for a game controller, wherein the transformation method realizes transformation by rotating a gamepad,
wherein the gamepad is connected with a gun-shaped body through a rotation part; and
wherein the rotation part comprises a rotating shaft and a sleeve sleeved on the rotating shaft; an outer wall of the rotating shaft is provided with a ring slot in a circumferential direction; an inner wall of the sleeve is snapped to a snap ring in the ring slot; and the rotating shaft and the sleeve are fixedly connected to the gamepad and the gun-shaped body respectively.

6. The form transformation method for the game controller according to claim 5, wherein the transformation method transforms the game controller into a gamepad form or a gun form by rotating the gamepad.

7. A game operation mode switching method, wherein the switching method realizes switching by rotating a gamepad,
wherein the gamepad is connected with a gun-shaped body through a rotation part; and
wherein the rotation part comprises a rotating shaft and a sleeve sleeved on the rotating shaft; an outer wall of the rotating shaft is provided with a ring slot in a circumferential direction; an inner wall of the sleeve is snapped to a snap ring in the ring slot; and the rotating shaft and the sleeve are fixedly connected to the gamepad and the gun-shaped body respectively.

8. The game operation mode switching method according to claim 7, wherein the switching method rotates the gamepad to trigger a mode switching mechanism to realize switching.

* * * * *